United States Patent
Greenfield et al.

(10) Patent No.: US 8,566,734 B1
(45) Date of Patent: Oct. 22, 2013

(54) SYSTEM AND METHOD FOR PROVIDING VISUAL COMPONENT LAYOUT INPUT IN ALTERNATE FORMS

(75) Inventors: Eliot Greenfield, Oakland, CA (US); David George, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1448 days.

(21) Appl. No.: 11/217,073

(22) Filed: Aug. 31, 2005

(51) Int. Cl.
*G06F 3/00* (2006.01)

(52) U.S. Cl.
USPC ........... 715/765; 715/760; 715/764; 715/766; 715/769

(58) Field of Classification Search
USPC ............... 715/765, 760, 764, 766; 717/107
See application file for complete search history.

(56) References Cited

U.S. PATENT DOCUMENTS

| | | | |
|---|---|---|---|
| 5,642,511 A | 6/1997 | Chow et al. | |
| 5,742,848 A | 4/1998 | Burgess | |
| 5,862,379 A | 1/1999 | Rubin et al. | |
| 6,178,432 B1 | 1/2001 | Cook et al. | |
| 6,182,278 B1 * | 1/2001 | Hamada et al. | 717/107 |
| 6,564,368 B1 | 5/2003 | Beckett et al. | |
| 6,760,902 B1 * | 7/2004 | Ott | 717/113 |
| 6,823,495 B1 | 11/2004 | Vedula et al. | |
| 7,024,633 B1 * | 4/2006 | Mann et al. | 715/765 |
| 7,039,875 B2 * | 5/2006 | Khalfay et al. | 715/762 |
| 7,111,245 B2 * | 9/2006 | Brockway | 715/764 |
| 7,117,452 B1 * | 10/2006 | Pavelski et al. | 715/792 |
| 7,159,185 B1 | 1/2007 | Vedula et al. | |
| 7,240,328 B2 | 7/2007 | Beckett et al. | |
| 2003/0020742 A1 * | 1/2003 | Hasha et al. | 345/700 |
| 2005/0182761 A1 * | 8/2005 | Kato | 707/3 |
| 2006/0090130 A1 * | 4/2006 | Bent et al. | 715/530 |

OTHER PUBLICATIONS

GUIML, creating dynamic GUI objects using XML, Kollar L., Mathematical and Computer Modelling, vol. 38, No. 7, Oct. 2003 , pp. 893-901(9) Publisher: Elsevier.*

Learning How to Code SVG: Scalable Vector Graphics, Kas Thomas, Aug. 3, 2001.*

"Adobe Illustrator CS3 Dynamic Learning Excerpt", Training Videos Books by AGI's Instructors, AGI Aquent Graphics Institute, http://agitraining.com/pages2/ill_3.html 2008, 5 pages.

"Adobe Illustrator: Illustrator Marquee Selection", AllExperts Search Adobe Illustrator, http://en.allexperts.com/q/Adobe-Illustrator-1027/Illustrator-1027/Illustrator-Margruee-Selection-1.htm 2008, 3 pages.

"Creating Special Effects, Lesson 12", Adobe Photoshop CS, http://www.adobe.com/education/pdf/cib/ps7_cib/ps7_cib12.pdf 2008, pp. 400-431.

(Continued)

*Primary Examiner* — Nicholas Augustine
*Assistant Examiner* — Meseker Takele
(74) *Attorney, Agent, or Firm* — Kilpatrick Townsend & Stockton LLP

(57) ABSTRACT

A system, method, and computer program product for creating a visual component in an application include a first functional unit operable to receive first input specifying logic functions of the visual component, a second functional unit operable to receive second input defining one or more visual assets to be included in a layout of the visual component, and a third functional unit operable to receive third input in alternate forms, said third input specifying one or more layouts of the visual component. The alternate forms may include tag input and script input.

19 Claims, 3 Drawing Sheets

(56) References Cited

OTHER PUBLICATIONS

"Getting to Know the Work Area", Adobe Illustrator CS Classroom in a Book, Lesson 1 http://www.adobe.com/education/pdf/cib/ps7_cib/ps7_cib01.pdf http://safari.adobepress.com/0201756242/ch01 2008, pp. 30-47.

"Microsoft Expression", 'Expression Blend' 2 Beta Download file://C:\DOCUME~1\ejOSWICK\locals~tEMP\zmf56O1D.htm 2008, 7 pages.

"Microsoft Expression Blend", Website, http://www.microsoft.com/expression/products/overview.aspx?key=blend, printed on Aug. 3, 2007.

"Microsoft Expression 'Expression Blend Design Ultimate Experiences'", http://www.microsoft.com/expression/products/features.aspx?key=blend 2008, 4 pages.

"Scalable Vector Graphics (SVG), About SVG . . . ", http://www.w3.org/Graphics/SVG/, downloaded from the Internet on Sep. 10, 2008 (redownloaded on Jul. 29, 2009).

"Selection Basics, French Fries", Adobe Illustrator CS Classroom in a Book, Lesson 2, http://adobe.com/education/pdf/cib/ill_cs/ill_cs_cib_02.pdf 2008, pp. 52-63.

"What's New", Adobe Illustrator CS3 Explore New Paths with the Essential Vector Tool, http://www.images.adobe.com/www.adobe.com/products/illustrator/pdfs/illustrator_datasheet.pdf 2008, pp. 1-9.

\* cited by examiner

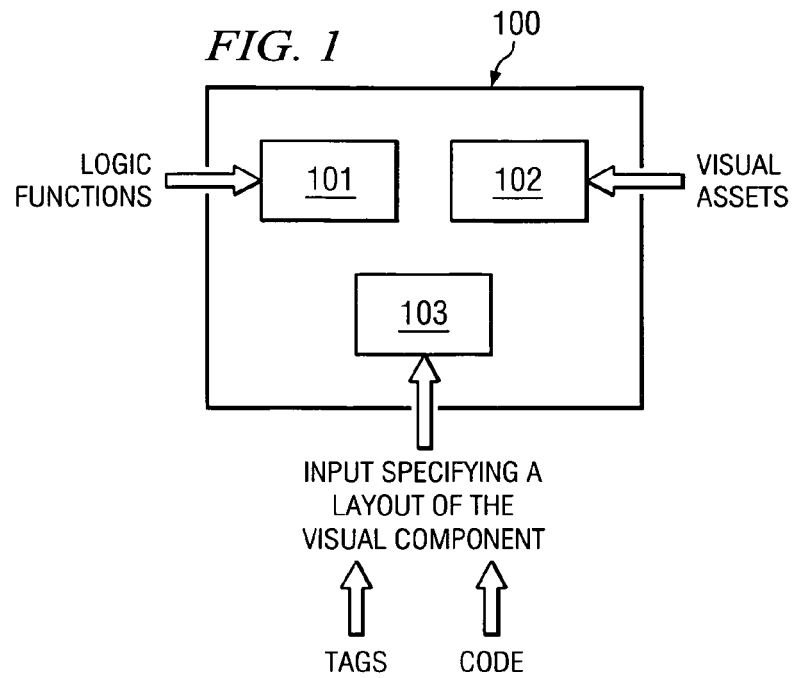
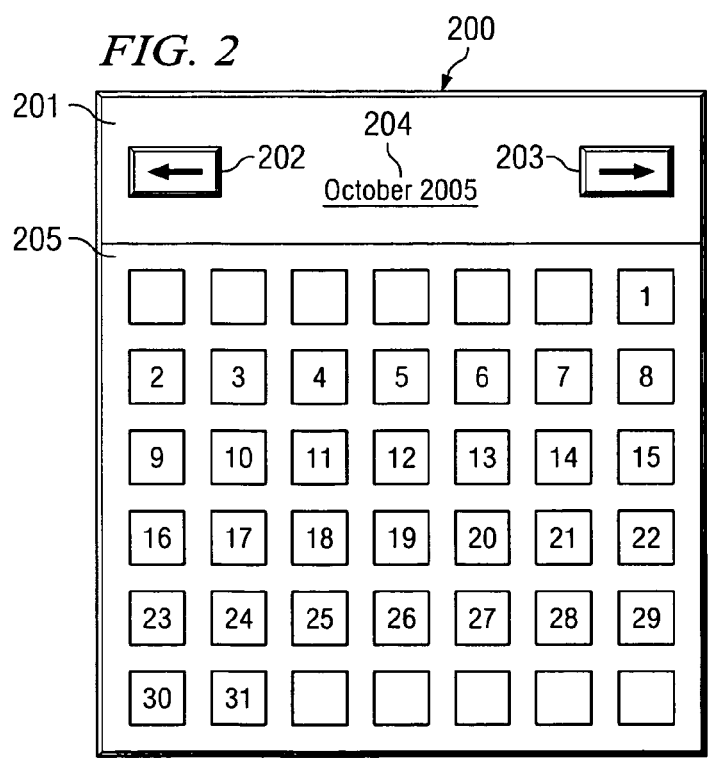

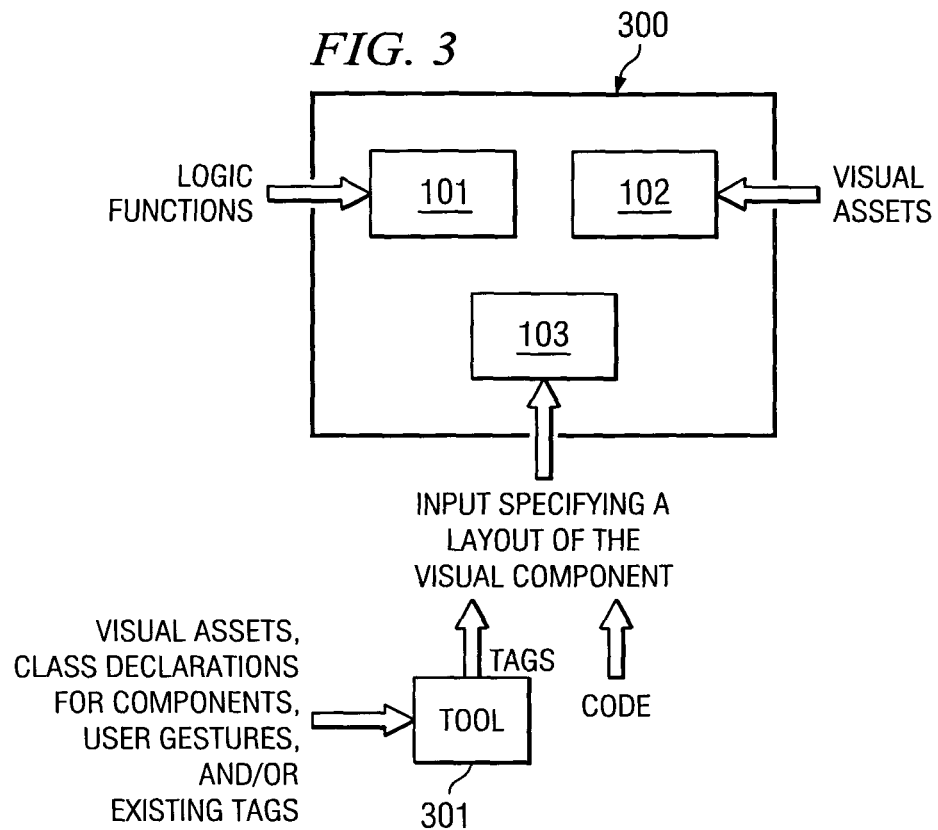
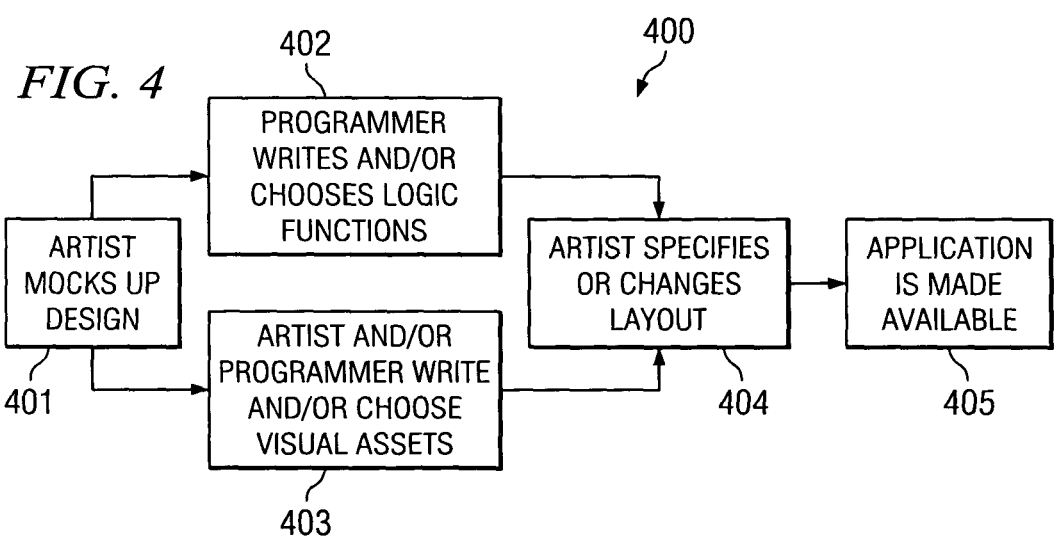

SYSTEM AND METHOD FOR PROVIDING VISUAL COMPONENT LAYOUT INPUT IN ALTERNATE FORMS

TECHNICAL FIELD

The present invention relates in general to specifying the appearance of an application and specifically relates to specifying the appearance of visual components in an application.

BACKGROUND OF THE INVENTION

A variety of programs on the market allow a developer (e.g., a web developer) to create web pages, websites, interactive applications, and the like for use by end users (e.g., visitors to websites). Examples of such programs include DREAMWEAVER™ and FLEX BUILDER™, each available from MACROMEDIA INC., of San Francisco, Calif.

DREAMWEAVER™ is an Integrated Development Environment (IDE) that allows web developers to design Hypertext Markup Language (HTML) web pages in a code editor and also in a graphical-based design time environment. In other words, DREAMWEAVER™ parses tags (e.g., HTML tags) and renders an interactive simulation of the application in the design time environment. Thus, a user may edit the application by directly editing the tags or by graphically manipulating the design time representation. As the user graphically manipulates the design time representation, the program changes the tags to reflect the modification. DREAMWEAVER™ also allows the developer to design with more than just HTML, such as, for example, the developer may use Active Server Page (ASP) and C# from Microsoft Corporation, COLDFUSION™ Markup Language (CFML™) from MACROMEDIA INC., and the like. Examples of other HTML IDEs include GOLIVE™, available from Adobe Systems Incorporated, and FRONTPAGE™, available from Microsoft Corporation.

FLEX BUILDER™ is an IDE for creating Rich Internet Applications (RIAs), which are interactive, multimedia applications, that may run on client-side players, for example, MACROMEDIA INC.'s FLASH™ player. MXML™ is the native tag-based language for FLEX BUILDER™, while ACTIONSCRIPT™ is a script-based procedural language for FLASH™-based RIAs. In developing RIAs using FLEX BUILDER™, a developer may write MXML™ tags and ACTIONSCRIPT™ code and save it in an MXML™ file to the FLEX™ server, which is a presentation level server for RIAs. The FLEX™ server includes a compiler that compiles the MXML™ and ACTIONSCRIPT™ into ACTIONSCRIPT™ bytecodes. The FLEX™ server saves the ACTIONSCRIPT™ bytecodes in a file, such as a Small Web Format (SWF) file, that can be downloaded and executed on a user's machine. SWF is the native file format for the FLASH™ player.

Web sites, RIAs, and other applications generally include one or more visual components, which are application elements that have a visual appearance on an end user's screen. Visual components may include text paragraphs, pictures, and the like. Visual components may also include form controls, such as check boxes, data grids, radio buttons, and the like.

When a developer is creating a visual component, such as by defining a new form control, the developer typically works with three conceptually different pieces. First, there is the logic function of the visual component. The logic function may, for example, direct that a data grid scrolls down to show the next row when an end user selects a button on a scroll bar. The logic function, therefore, controls or defines the performance of some kind of event. The second piece is the appearance of each separate part of the component. This includes different visual assets, such as an icon that appears on a button, the thickness of a border around the edge, the various colors, and the like. The third piece is the organization of the visual assets relative to one another to produce the layout of the visual component. The third piece includes, for example, the position of a scroll bar button above a scroll bar track, the position of a second button below the scroll bar track, a border along the outside of a data grid, and the like.

Traditionally, application development groups have relied on developers (i.e., programmers) to provide all three of those pieces—writing code for the logic, using code to create functions to draw the individual visual assets, and using code to position the visual assets in the visual component.

Relying solely on code to create an application usually means that an artist/designer cannot directly change the appearance of visual assets because artists/designers are typically not programmers. The appearance of the visual component often reflects the artistic talent involved in its creation. Thus, a disadvantage of having developers, rather than artists/designers, directly involved with all three of those pieces is that there is a limit to how expressive and artistic the application can be. The traditional process is for an artist/designer to mock up the appearance of the application and then give it to a programmer who approximates the appearance in the application. However, the programmer may, for example, fail to arrange the visual assets in a pleasing way, which is often a subtle task. The process then goes back to the artist/designer, who provides input to the programmer to make changes. Application development can, therefore, be a frustrating, iterative experience when artists/designers are not able to directly affect the appearance of the application.

TRILLIAN™, an Instant Messenger (IM) client from Cerulean Studios of Connecticut, is an example of an application that allows artwork to be positioned using a tag-based language. WINAMP™, a digital music player from Nullsoft of Sedona, Ariz., is another example of such an application. However, neither TRILLIAN™ nor WINAMP™ allows a programmer to contribute to the artwork using a script-based language. Accordingly, there is no available technology that allows both artists/designers and programmers/developers to directly affect the artwork of an application.

BRIEF SUMMARY OF THE INVENTION

The present invention is directed to a system, method, and computer program product which, in some embodiments, allows an artist to directly change the appearance of an application by allowing the positional relationships of the visual assets to be described using a tag-based language. Because of the ease of use of tag-based languages, a non-programmer artist may be able to directly affect the tags in a file. Further, the simplicity of tags allows for the development of tools that parse tags and provide a user with a design view in which the user may visually interact with the content by dragging, dropping, widening, and the like with a cursor as the tool correspondingly modifies the tags. In addition, the system, method, and computer program product allow for a developer to write script that defines the layout. Further, various embodiments allow the appearance of an application to be modified through use of a tag-based language by changing visual asset positional relationships that were originally created with a script-based language, and vice-versa. As a result, various embodiments allow for the layout of visual components to be defined using script and tags, and both developers and artists can be directly involved in the design of an application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is an illustration of an exemplary system adapted according to one embodiment of the invention;

FIG. 2 is an illustration of an exemplary visual component that may be created according to one embodiment of the invention;

FIG. 3 is an illustration of an exemplary system for creating a visual component of an application adapted according to one embodiment of the invention;

FIG. 4 is a block diagram of an exemplary workflow adapted according to one embodiment of the invention;

DETAILED DESCRIPTION OF THE INVENTION

Figure 5:
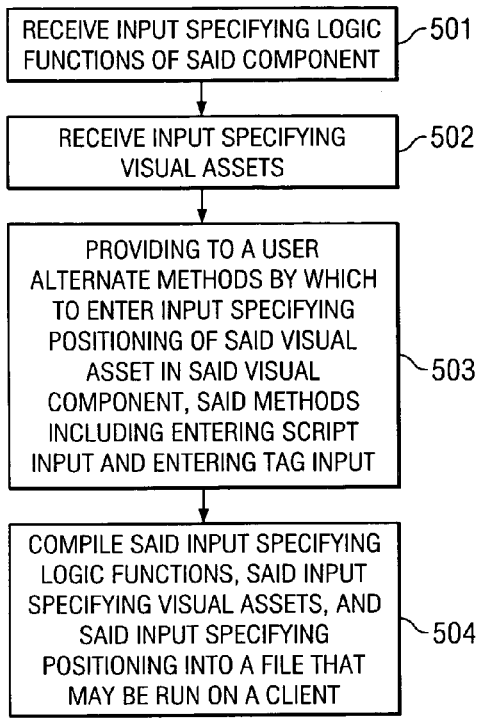
FIG. 5 is a flowchart illustrating an exemplary method, which may be performed by a system, such as a compiler, adapted according to one embodiment of the invention.

FIG. 1 is an illustration of example system 100 adapted according to one embodiment of the invention. In one specific example, system 100 is a FLEX™ compiler that is modified to compile a tag-based description of a layout of artwork (i.e., assets) in a visual component. System 100 includes three functional units 101-103.

Functional unit 101 receives input defining logic functions of a visual component. The input is usually in the form of code. For example, in a FLEX™ embodiment, a programmer uses ACTIONSCRIPT™ code to describe the various logic functions. It should be noted that ACTIONSCRIPT™ code is also used to create the class declaration of the component and the function to draw the various parts of the visual component. In fact, the input defining the logic functions and the class declaration for the component are usually included in the same file.

Functional unit 102 receives input defining the visual assets to be arranged in the component. Examples include icons, color backgrounds, and the like. Assets may be bitmap objects or may be vector graphics that are created with a FLASH™ authoring tool. Each asset may be included in its own separate file.

Functional unit 103 receives input specifying a layout of the visual component. In other words, unit 103 receives input defining the arrangement of the assets in the component. Functional unit 103 can receive its input in the form of either tags, script, or both, even though functional unit 103 controls the layout of the visual component. In one example, the tags are written in a dialect or schema of Extensible Markup Language (XML) specifically created to declaratively define arrangements of assets, as will be described below.

A possible advantage of allowing a user to describe a positional layout in a tag-based language is that tools exist (or may be further developed) that can parse tags and present an interactive simulation of an application based upon those tags. The tool may further rewrite the tags as a user manipulates the component in the interactive simulation. Examples of tools that parse tags and present an interactive visual simulation of an application include DREAMWEAVER™ and FLEX BUILDER™, although other tools exist and may be developed. In fact a tool may specifically be developed for use with the particular XML schema that defines the arrangement of the assets. Thus, with the help of such a tool, a person with little or no coding experience can directly affect the appearance of an application by dragging, dropping, widening, etc., the visual assets in a rendered design view using a mouse or other pointing device.

The input that specifies the layout of the component may be referred to as an "artwork broker" because of its conceptual position between the logic and the artwork fragments. While functional units 101-103 are shown separately in system 100, such an arrangement is for convenience only. Functional units 101-103 may, in some embodiments, be part of the same computer program. Alternatively, functional units 101-103 may be stored in different files. Whether functional units 101-103 are separate programs, part of the same program, or combined in one or more ways, each arrangement is within the scope of various embodiments.

FIG. 2 is an illustration of example visual component 200 that may be created according to one embodiment of the invention. Component 200 is a calendar layout form control, and it allows a user to pick a date. Component 200 includes, among other things, border 201, buttons 202 and 203, current month indicator 204, and days of the month 205. An end user may select one of the dates to choose a date or select previous month button 202 or next month button 203 to go to a different month.

When component 200 is dissected, there are arrow icons on buttons 202 and 203, which are artwork fragment or assets, sometimes called "skins." Further, there is a label that displays the current month in current month indicator 204. There are text fields in days of the month 205—one per day. Such artwork is a non-exhaustive list of the fragments that make up the visual appearance of the calendar. The visual appearance is also affected by the positional arrangement of the artwork fragments in component 200. In other words, an artist or developer specifies that previous month button 202 is positioned near the top left corner of component 200, next month button 203 is positioned near the top right corner, the label displaying the current month is positioned between buttons 202 and 203, and each of the text fields showing days are arranged in sequential order.

The arrangement may be specified in script, such as ACTIONSCRIPT™ code, wherein code is written that explicitly sets the positions. Alternatively, the arrangement may be specified using a tag-based language. For instance, an example tag to position a skin for previous month button 202 may include the following portion of an artwork broker file:

```
<artworkBroker>
    <skin id="previousMonth" x="10" y="10"
        width="50"height="50" source="leftarrow.jpg"/>
</artworkBroker>
```

The file contains tags—an artworkBroker tag at the root and a skin tag. The skin tag has an id attribute that specifies that it is the previous month's skin and specifies that the correct icon is found in a Joint Photographic Experts Group (JPEG) file. The skin tag also declares the position and the geometry of the skin, x=10, y=10, width=50, height=50. By using tags to specify how the skins are positioned, it is possible to develop or find a tool, such as DREAMWEAVER™ or FLEX BUILDER™, that can read the file and parse the tags. The tool can then simulate the appearance in a design view. Using the design view of the tool, the user may interact with the component, such as by selecting the visual asset for previous month button 202 and dragging it over 5 pixels. The tool then rewrites the skin tag to change the x value from a 10 to a 15. It should be noted that it is very difficult, though not impossible, to develop a tool that can parse and manipulate script, rather than tags.

FIG. 3 is an illustration of example system 300 for creating a visual component of an application adapted according to one embodiment of the invention. System 300 is similar to system 100 (FIG. 1); however, system 300 explicitly shows receiving tag input from tool 301. Tool 301 is a tool like the one described above in that it parses the tags and renders an interactive visual approximation of the application, wherein the developer or artist can change the tags by manipulating the visual representation. In embodiments wherein tool 301 is separate, it may be desirable to input class declarations of the components of the application and the visual asset files in order to properly render a complete design view of the component for the user. However, if the purpose of tool 301 is merely to edit the artwork broker, then no class declarations may be needed. Accordingly, typical inputs for a tool may include, for example, visual assets and user gestures as input. If tool 301 is used to edit an already-existing artwork broker, then it may accept visual assets, user gestures, and the existing tags as input. It should be noted that system 300 also allows a programmer to enter the layout input in the form of script, thereby offering users the choice of laying out components through either script or tags.

With the use of systems 100 and 300, a group that creates applications may be able to take advantage of a new workflow. FIG. 4 is a block diagram of example workflow 400 adapted according to one embodiment of the invention. In block 401, the artist creates a mock up design for the application so that the look and feel are communicated to programmers, manager, and others. If the mock up is acceptable, then the programmers write and/or choose logic functions in block 403. Further, the artist and/or programmers write and/or choose visual assets in block 403. In block 404, the artist directly specifies and/or changes the layout of the application components. It is possible that the programmers will have already defined an initial basic layout for the application using a tag-based language, and the artist implements changes and/or fine tunes the layout in the tag-based language. The artist's role in block 404 is facilitated by the use of the tag input that can be easily written and changed with a text editor or with a tool, as described above. While block 404 shows the artist directly affecting the layout, script input from programmers may also be used to affect the layout, such that both artists and programmers are involved in completing the application using two different techniques. Accordingly, both artists and programmers can directly affect the appearance of the application using methods that are more natural to each—script for programmers and tags for artists. Finally, the application is made available in block 405, by, for example, uploading the application to a server for access by end users on a network.

The difference between workflow 400 and traditional processes is that the artist is directly involved in specifying and changing the layout of the application in workflow 400. In traditional processes, however, artists instruct the programmers about the layout but do not directly affect the layout. In other words, traditional workflows put programmers between artists and the layout such that artistic input is filtered and interpreted through programmers before a final draft of an application is completed. On the other hand, workflow 400 may produce a finished application that better reflects the talent of the artist. Enabling workflow 400 is one advantage of various embodiments of the invention.

Figure 6:
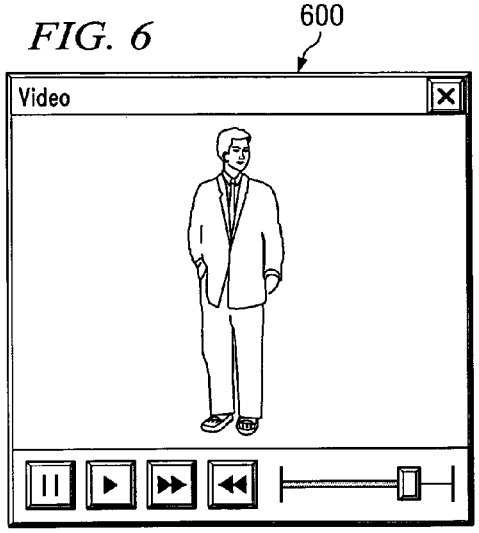
FIG. 6 is an illustration of an exemplary video control interface adapted according to one embodiment of the invention.

FIG. 5 is a flowchart illustrating example method 500, which may be performed by a system, such as a compiler, adapted according to one embodiment of the invention. In step 501, the system receives input specifying logic functions of a component. In one example, users are designing and developing an application that includes a video in a VCR-type interface that has play, pause, and reverse/forward buttons. In this example, the logic functions are written in ACTIONSCRIPT™ and are included in one or more separate files that include both the logic functions and the class declaration of the component. The component logic specifies, for example, that the video stops when the pause button is selected. In this example, component logic is provided by a programmer because it is described using script, which usually requires some amount of programming experience. Example VCR-type interface 600, adapted according to one embodiment, is shown in FIG. 6.

Returning to FIG. 5, in step 502, the system receives input specifying visual assets. In the VCR control example, the input describes the appearance of the buttons and includes icons as skins for the buttons. The assets include, for example, bitmap objects or vector representations from a FLASH™ authoring tool or the like. In this example, the play button skin includes a triangle, and the pause button skin includes two vertical lines, easily recognizable by most end users as corresponding to actual VCR control buttons. The appearance input is included in one or more separate files in this example.

In step 503, the system provides to a user alternate methods by which to enter input specifying positioning of the visual assets in the visual component, the methods including entering script input and entering tag input. Specifying the positions of the visual assets includes defining how the skins are arranged relative to one another. In the VCR controls example, a user may specify that the pause button is on the left, the play button is just to the right of the pause button, the fast forward button is just to the right of the play button, etc.

In step 503, a programmer "hard codes" the location of the skins in the files that describe the logic or in separate files. Alternatively, the positional relationships may be expressed using tags. For instance, an artwork broker file for the VCR controls component includes a first "artworkBroker" tag, and contained within the artwork broker tag is a skin tag. For each button, the skin tag includes coordinates and geometric relationships, such as x="10", y="10", width="40", height="60", and the like. Further, the skin tag may include source attributes that point to files of artwork fragments for each button. In other words, the artwork broker file describes the layout of the skins. As described above, third parties can create tools operable to rewrite and change the tags based on visual user interactions, such as dragging and dropping. Such a tool may allow a designer or artist, as opposed to only programmers, to specify and change the location of the assets directly.

A point related to that illustrated by FIGS. 1, 3, and 5 is that some embodiments of the invention allow tags and script to be interchangeable ways to create and modify layouts. Accordingly, layouts can be created by tags and modified by script, created by tags and modified by tags, created and modified by script, or any combination thereof. Thus, some embodiments may include an IDE that can be employed in all stages of application development other than mock-up.

In step 504, the system compiles the input specifying logic functions, the input specifying visual assets, and the input specifying positioning into a file that may be run on a client. The client may be, for example, a browser with a FLASH™ player plug-in that receives a SWF file from a server and executes it, thereby displaying the application on a user's screen.

In an example using a FLEX™ server, it is the compiler that performs step 504. If the compiler determines that the input specifying logic functions and the input specifying positioning are both in ACTIONSCRIPT™, then the compiler converts the script into bytecodes, which it includes in a SWF file. On the other hand, if the compiler determines that the input specifying positioning is in the form of tags, then the compiler first compiles that input into ACTIONSCRIPT™ class declarations. The compiler is equipped with a mapping between the tags and the script. This allows the compiler to convert, for example, tags of an XML dialect into ACTIONSCRIPT™ code. Next, the compiler converts all of the ACTIONSCRIPT™ into bytecodes, which it includes in a SWF file.

An advantage of various embodiments is that users who create applications (artists and programmers) have a choice of methods in specifying the layout in the same project. Artists may use a tool to manipulate tags, while programmers may continue to write script or may use tags, depending on their preferences. It should be noted though, that some artists may describe the layout in script, depending on their programming experience.

In the examples herein, an application is typically made up of multiple components. For any single component, the layout may be specified using either tags or script. However, it is possible for an application to contain both components with tag-based artwork brokers and components with script-based artwork brokers. When the artwork broker is expressed using code, the artwork broker does not have to refer to external visual assets. Instead, the code could include commands like "drawRectangle( )" or "drawLine( )" that programmatically draw the visual appearance of the component.

Similarly, when the artwork broker is expressed using tags, the artwork broker could include a tag, such as <rectangle x="0" y="0" width="50" height="100" color="red">, which causes a red rectangle to be drawn. In other words, there is no requirement that the artwork broker and the visual assets be distinct from one another. Instead, the two can be combined together, such that steps 502 and 503 may be performed together.

Some of the examples above specifically employ a FLEX™ server and use ACTIONSCRIPT™ for class declarations, logic, and the like; however, various embodiments of the invention are not so limited. In fact, many application creation systems that use code or script to declare classes and apply logic may benefit from some embodiments. For example, a system that creates HTML web pages and employs JAVASCRIPT™ can be modified to receive input specifying layouts in the form of tags as well as continuing to allow programmers to specify layouts using JAVASCRIPT™.

The examples herein describe that tags and script may each be used interchangeably to create and modify layouts of visual components. It should be noted that other forms of coding besides ACTIONSCRIPT™ may be adapted for use in some embodiments. For example, any other kind of procedural or declarative code, including JAVASCRIPT™, JAVA™, C, or C++ may be used with some embodiments of the invention. Further, in addition to the examples herein, tags may include any declarative file format that can be easily written or read by a tool, such as Portable Network Graphics (PNG) from CompuServe Interactive Systems, Inc., or Microsoft Corporation's Microsoft Foundation Class (MFC) Resources file format.

Further, while the examples herein describe the layout of visual assets in form control components (date choosers and VCR-type controls), embodiments of the invention may be used to specify the layout of assets in other types of components as well. Any type of component that includes visual assets may benefit from various embodiments. For example, a panel is a type of component that includes a title bar, a border, and graphic content. Various embodiments of the invention can be used to specify the positional relationship of the title bar, the border, and the content inside the panel.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 7:
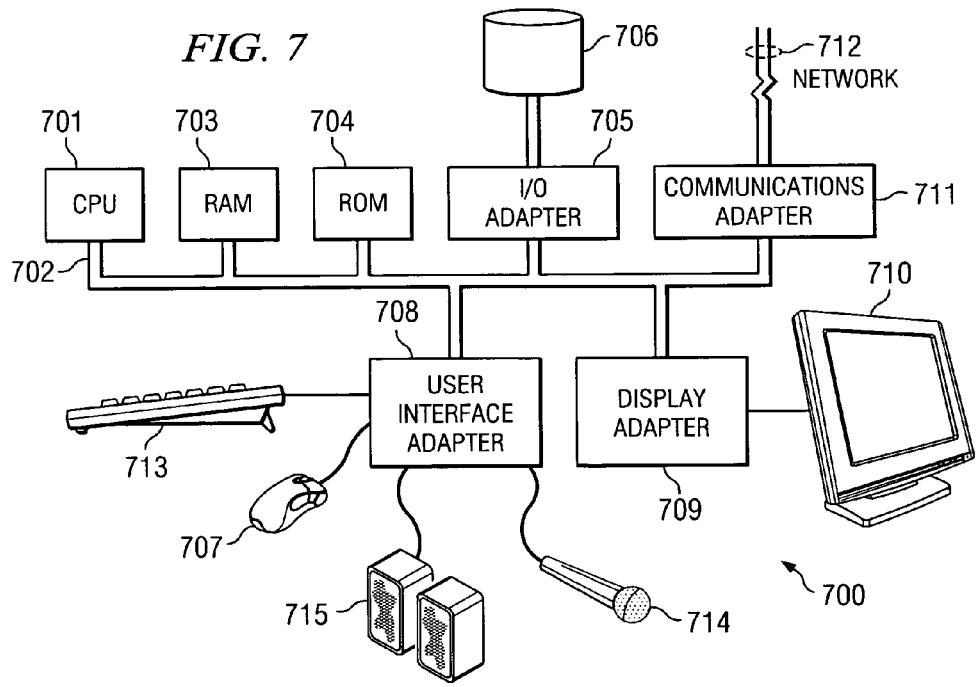
FIG. 7 illustrates an example computer system adapted according to embodiments of the present invention.

FIG. 7 illustrates example computer system 700 adapted according to embodiments of the present invention. That is, computer system 700 comprises an example system on which embodiments of the present invention may be implemented. Central processing unit (CPU) 701 is coupled to system bus 702. CPU 701 may be any general purpose CPU. However, the present invention is not restricted by the architecture of CPU 701 as long as CPU 701 supports the inventive operations as described herein. CPU 701 may execute the various logical instructions according to embodiments of the present invention. For example, CPU 701 may execute machine-level instructions according to the exemplary operational flows described above in conjunction with FIG. 5.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as, for example, entering XML or ACTION-SCRIPT™ code.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for program 703. Communications adapter 711 is preferably adapted to couple computer system 700 to network 712 (e.g., the Internet). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display a design view or a rendered application to a user.

It shall be appreciated that the present invention is not limited to the architecture of system 700. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:
   receiving layout instructions for a visual component under development in a development environment executing on a computing system, said layout instructions based at least in part on one or more tags in a tag-based language, the one or more tags identifying a part of the visual component, specifying a visual asset to be displayed for the part of the visual component, and specifying positioning of the visual asset for the part of the visual component;
   parsing at least said one or more tags to render an interactive visual approximation in said development environment of said part of the visual component;
   receiving one or more logic functions at said computing system, the logic functions defining one or more functionalities of the part of the visual component;
   receiving the visual asset at said computing system; and
   executing instructions on said computing system so that said one or more logic functions, said visual asset, and said layout instructions are combined to provide function and display of the part of the visual component on a display device.

2. The computer implemented method of claim 1 wherein said layout instructions further comprise class declaration in a script-based language further specifying a layout of said component.

3. The computer implemented method of claim 1 wherein said tag-based language layout input includes tags from one or more of:
   Extensible Markup Language (XML); and
   Hypertext Markup Language (HTML).

4. The computer implemented method of claim 1 wherein said development environment rewrites said one or more tags based on user manipulation of said interactive visual approximation of said part of the visual component.

5. The computer implemented method of claim 1 further comprising compiling said one or more logic functions, said visual asset, and said layout instructions into a file that may be run on a client.

6. The computer implemented method of claim 5 further comprising downloading said file to said client.

7. The computer implemented method of claim 1 wherein said visual asset comprises an artwork fragment.

8. The method of claim 1 further comprising:
   receiving change layout instructions in said tag-based language, wherein said change layout instructions changes said positioning established by said layout instructions in said script-based language.

9. A computer program product having a computer readable medium having computer program logic recorded thereon, said computer program product comprising:
   code for receiving first input specifying logic functions of a visual component under development in a development environment;
   code for receiving second input specifying visual assets to be used in presentation of said visual component;
   code for receiving third input comprising tag-based language comprising layout instructions, said layout instructions based at least in part on one or more tags in a tag-based language, the one or more tags identifying a part of the visual component, specifying a visual asset of the visual assets to be displayed for the part of the visual component, and specifying positioning of the visual asset for the part of the visual component;
   code for receiving fourth input comprising script-based language, said fourth and third inputs specifying an arrangement of said visual assets on said presentation of said visual component; and
   code for combining said first, second, third, and fourth inputs to generate said presentation.

10. The computer program product of claim 9 further comprising code for manipulating said third input in response to a user interacting with said presentation of said visual component in said development environment.

11. The computer program product of claim 9 further comprising code for compiling said first, second, third, and fourth inputs into a file that may be run on a client.

12. The computer program product of claim 9 further comprising:
   code for compiling said third input into script from said script-based language.

13. The computer program product of claim 9 wherein said visual assets include a plurality of artwork fragments.

14. The computer program product of claim 9 further comprising:

code for receiving additional third input in said tag-based language, wherein said additional third input changes parts of said arrangement specified by said fourth input in said script-based language.

15. A system comprising:

a storage device coupled to a central processing unit (CPU);

a computer program stored on said storage device, wherein, when executed by said CPU, said executed computer program defines an integrated development environment (IDE), said IDE comprising:

a design view configured to simulate an appearance of a visual component, wherein said visual component comprises a combination of:

logic code defining a logic function of a part of said visual component; and artwork broker input comprising one or more tags specifying an artwork fragment to be displayed for the part, specifying a positional attribute of said artwork fragment, and associating said logic function with said part of said visual component; and one or more input devices configured to receive user input manipulating said simulated appearance of said visual component in said design view, where said IDE interprets said user input to modify said one or more tags to specify a changed positional attribute of said artwork fragment.

16. The system of claim 15 wherein said artwork broker input includes class declarations specifying a layout of said visual component for said positional arrangement.

17. The system of claim 15 wherein said one or more input devices is further configured to receive script input in said script-based language configured to modify said positional arrangement defined in said script-based language.

18. The system of claim 15 wherein said artwork broker input further includes one or more artwork broker tags in said tag-based language and wherein said one or more user input devices is further configured to receive script input configured to modify said positional arrangement defined in said script-based language and by said one or more artwork broker tags.

19. A computer implemented method comprising:

receiving first input specifying logic functions of a visual component under development in a development environment;

receiving second input specifying visual assets to be used in presentation of said visual component;

receiving third input comprising tag-based language comprising layout instructions, said layout instructions based at least in part on one or more tags in a tag-based language, the one or more tags identifying a part of the visual component, specifying a visual asset of the visual assets to be displayed for the part of the visual component, and specifying positioning of the visual asset for the part of the visual component;

receiving fourth input comprising script-based language, said fourth and third inputs specifying an arrangement of said visual assets on said presentation of said visual component; and combining said first, second, third, and fourth inputs to generate said presentation.

* * * * *